(No Model.)
E. BAKER.
DIAPHRAGM FOR MANUFACTURING CHLORIN AND CAUSTIC SODA BY MEANS OF ELECTROLYSIS.
No. 579,250.
Patented Mar. 23, 1897.
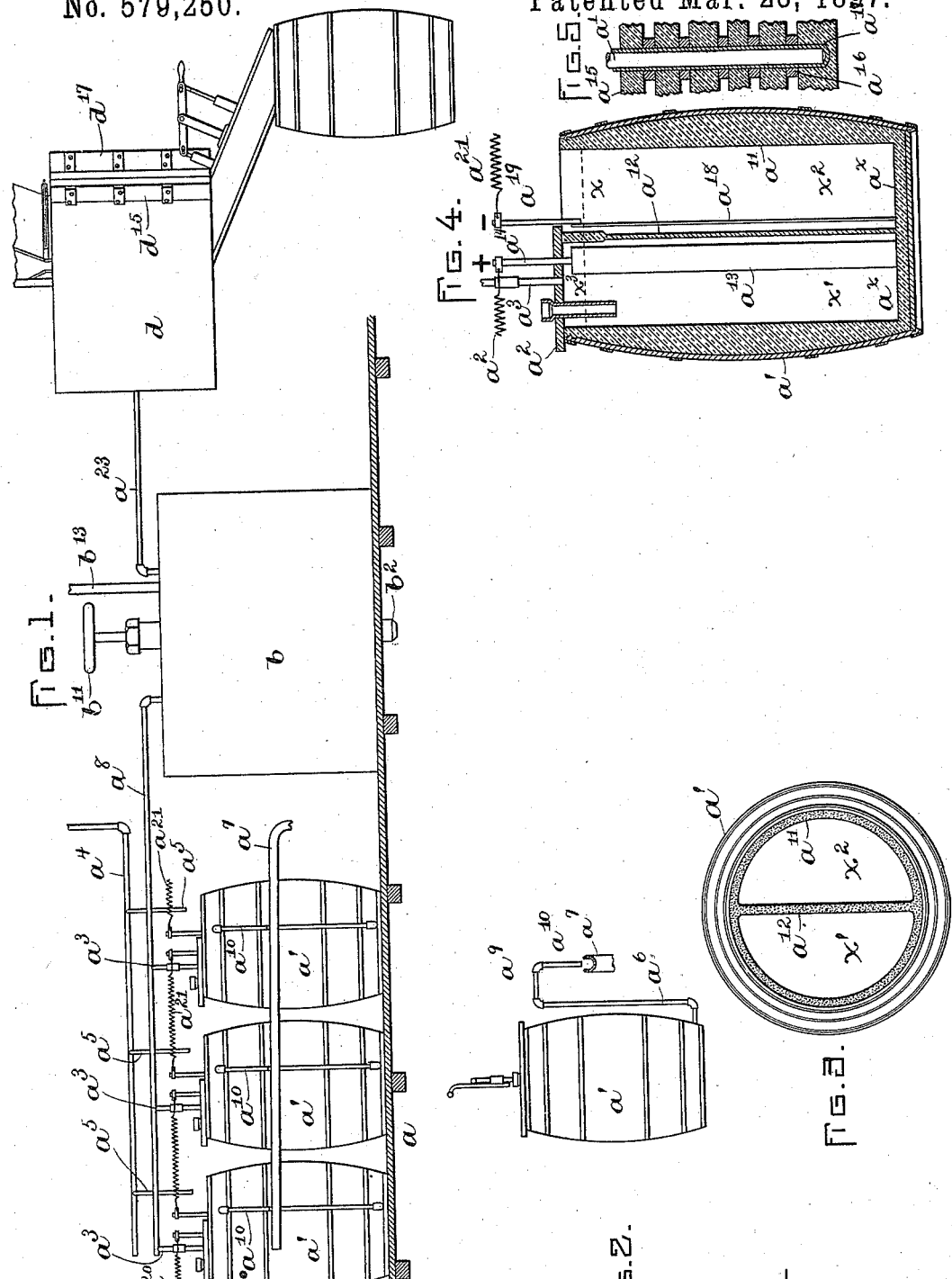

UNITED STATES PATENT OFFICE.

ELBRIDGE BAKER, OF WINCHESTER, MASSACHUSETTS, ASSIGNOR TO THE NASHOBA COMPANY, OF AYER, MASSACHUSETTS.

DIAPHRAGM FOR MANUFACTURING CHLORIN AND CAUSTIC SODA BY MEANS OF ELECTROLYSIS.

SPECIFICATION forming part of Letters Patent No. 579,250, dated March 23, 1897.

Application filed April 6, 1895. Serial No. 544,716. (No model.)

*To all whom it may concern:*

Be it known that I, ELBRIDGE BAKER, of Winchester, in the county of Middlesex and State of Massachusetts, have invented certain new and useful Improvements in Diaphragms for Manufacturing Chlorin and Caustic Soda by Means of Electrolysis, of which the following is a specification.

This invention relates to an improvement in the method of and apparatus for the production of chlorin and caustic soda by means of the electrolysis of a solution of salt.

Figure 1 represents a front elevation of an apparatus constructed in accordance with my invention. Fig. 2 represents a detail view of one of the cells and its inclosing case. Fig. 3 represents a cross-sectional view of one of the cells and its inclosing case. Fig. 4 represents a vertical sectional view thereof. Fig. 5 represents a vertical sectional view of an anode made in accordance with my invention.

My invention has particularly in view the generation of chlorin and caustic soda from a solution of common salt. For the production of these said products commercially it is desirable that the process be practically continuous, and to this end it is necessary that the products resulting from the decomposition of the solution be kept separate, otherwise the hydrogen and chlorin will unite to form hydrochloric acid, or the chlorin and caustic soda will unite to form chlorinated soda. In the first case the substance formed has practically no value, while the last-mentioned product in solution is decomposed more readily than a solution of salt, and as soon as it is decomposed it immediately recombines, thus establishing continuous useless local actions and retarding the decomposition of the brine. These difficulties are overcome by my invention. The products—*i. e.*, chlorin, hydrogen, and caustic soda—are kept separate and drawn off at different points, thus permitting the process to be carried on indefinitely. Upon the passage of the electric current through an aqueous solution of sodium chlorid—to wit, $NaCl-H_2O$—the solution is decomposed, the chlorin being liberated at the anode. The sodium is liberated at the cathode, where the liberated soda immediately decomposes, the water uniting with an equivalent of oxygen and hydrogen, forming sodium hydrate or caustic soda (NaHO.) The other equivalent of hydrogen escapes as a gas at the cathode. These operations are represented by chemical symbols as follows:

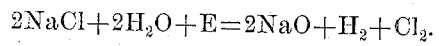

$$2NaCl + 2H_2O + E = 2NaO + H_2 + Cl_2.$$

The final products of the electrolysis are then chlorin, caustic soda, and hydrogen. The hydrogen being gas will bubble up and escape at the cathode. The chlorin will escape in like manner at the anode after the solution in which it is liberated becomes saturated with this gas. The caustic soda will sink to the bottom of the solution. The chlorin can be led off into a suitable receptacle. The caustic soda is preferably drawn off from the bottom of the apparatus to maintain a certain level of the solution, as will be described. The hydrogen escapes at the top of the apparatus or may be collected, if desired, as in the case of the chlorin. The last-mentioned product has no tendency to diffuse downward, and no provision is necessary against the downward movement of the chlorin.

It is necessary to prevent contact between the chlorin liberated at the anode and the hydrogen and sodium or caustic soda at the cathode without making a separation that will destroy or materially impede the electrolytic action. This I accomplish by means of the method below described and the mechanism illustrated in the accompanying drawings.

The method by which I carry out my invention consists in supplying the ingredients of the electrolyte to the compartments of a vertically-divided cell in such manner as to maintain the same level in both compartments, thus reducing any tendency to diffusion from one compartment to the other, owing to a difference of level, and in this connection to use a cell divided into compartments by a diaphragm so constructed, as will be described, that it will not offer any material resistance to the electrolytic action, but will prevent the mingling of the solutions. There have been many attempts to produce a diaphragm of this sort that could be used without speedily becoming clogged, and thus rendering it worthless, but none of these attempts have been successful.

It is well known that a diaphragm composed of hydraulic cement is most efficient in resisting the destructive action of the halogens and of the alkaline solutions, but such diaphragms are defective and practically worthless after little use on account of their density and lack of porosity and further on account of the pores of the cement diaphragm being speedily clogged up.

I am aware that attempts have been made to increase the porosity of the cement diaphragm by mixing or commingling with the cement a substance soluble in water, and for this purpose common salt has been used, which is designed to be dissolved out after the diaphragm has been made, but I am not aware that such diaphragms have been commercially successful, for it will be seen that while the soluble substance on the outside of the cement diaphragm would be dissolved out by the solution the portion of the salt embedded in and surrounded by a solid wall of cement would not be dissolved out, owing to the fact that the solution is prevented from reaching this portion of the soluble substance by the envelop of cement, so that the resultant product would be essentially a solid cement diaphragm having its surface honeycombed.

The cells of the honeycombed surfaces do not penetrate through the diaphragm, for if they did the diaphragm would become worthless, as it would permit of the mixing of the solutions on opposite sides of the same.

This invention has for one of its objects to provide a diaphragm which possesses the resisting properties of the cement diaphragm and which in addition thereto possesses the desired porosity, so that it will permit of the passage through it for a substantially indefinite time of the ions liberated by the electric current, and will not permit of the passage of the solutions on opposite sides of it, but will maintain such solutions separated and in their respective chambers or cells and will remain in its operative condition without danger of becoming clogged up for a substantially indefinite time.

Prior to this invention I am also aware that it has been proposed to use as a diaphragm a bed or wall of loose sand. A bed of loose sand possesses the desirable properties for a successful diaphragm to a certain degree in that it possesses the desired resisting or non-destructive properties and also the intergranular spaces formed by contact of the irregular grains or particles of sand one with another when at rest and in which state the bed of sand would possess the desired and proper porosity.

A bed or diaphragm of loose sand, while possessing the desirable features or properties described under conditions not present in an electrolytic apparatus, is defective for electrolytic purposes owing to the fact that a bed of loose sand in a solution loses part of its weight and becomes too porous, owing to the fact that the particles of sand are agitated or disturbed by the passage through the sand bed of the ions liberated on opposite sides of it, and therefore the use of a bed or wall of loose sand is prohibited in a practical and commercial electrolytic apparatus. In accordance with this feature of my invention I employ sand as the basis of my improved diaphragm and incorporate with the sand in a loose state a binder of hydraulic cement, which binder is added to and mixed with the loose sand in such quantities or amounts as will enable the particles of sand to be bound together at their contiguous points and not in such quantities as will fill the intergranular spaces—that is, the spaces between the bound particles or grains of sand.

In practice I prefer to use only sufficient cement as will bind the loose particles of sand and not fill the intergranular spaces which form the pores of the completed diaphragm, so that when the cement binder becomes set a firm diaphragm is obtained, in which the sand is in excess of the cement and which possesses the properties requisite for a successfully-commercial diaphragm for electrolytic apparatus—namely, the resistance to the destructive action of the halogens and the alkaline solutions and the proper porosity to permit of the passage of the ions and not of the solutions, and which will not become clogged after little use.

The proportion of the cement binder to the sand may be varied from five to fifty per cent. and good results obtained, but I prefer to employ an amount of sand largely in excess of the binder.

The sand diaphragm referred to is employed in a cell of halogen and alkaline-resisting material, and for the sake of cheapness and durability I prefer to make the cell of the same material as the diaphragm, but instead thereof other suitable materials may be used. When the walls of the cell are made of the same material as the diaphragm, I prefer to form or mold the cell within a casing, which may be of wood or metal, and to form or build the diaphragm so as to form an integral part of the said cell.

The cell and its diaphragm may be made in the following manner: A cask or casing of the desired size and shape to form the outside shell of the apparatus has placed in it a suitable form of suitable size to leave a space between it and the shell substantially equal to the thickness it is desired the bottom and side walls of the cell should be. The mixture of sand and cement binder are then placed in the said space and allowed to set, after which the said form is removed and a suitable form for shaping the diaphragm is placed in the cell, and the mixture of sand and its binder are then filled in between the sides of the form and allowed to set, after which the diaphragm form is removed, when it will be found that the diaphragm is integrally united to the bottom and side walls of the cell.

In order to successfully and economically produce caustic soda and chlorin in the electrolytic apparatus, it is desirable that the two bodies which are in compartments or chambers on opposite sides of the sand diaphragm should not diffuse from one compartment into the other, which would result in a mixture commercially worthless and necessitate the stopping of the apparatus and the loss of the material in the same, especially the caustic, which would have to be removed and replaced by a fresh charge. This result is avoided by maintaining an equilibrium in the two chambers on opposite sides of the diaphragm, and this equilibrium is effected by drawing off or discharging the caustic solution at substantially the same level as the solutions in the two compartments.

The discharge of the caustic solution I prefer should be continuous.

I introduce salt into the anode-compartment as needed. This does not materially affect the level of the liquid, and as there is no loss of water in this compartment the level remains constant.

A salt solution is fed into the cathode-chamber, as required, the discharge-pipe serving to maintain a constant level and also, owing to the point at which it leaves the cathode-compartment, serves to draw off the caustic soda.

From the foregoing it will be seen that by my method the manufacture of chlorin and also of soda can be carried on continuously and in an inexpensive manner, a complete separation of the products being maintained by my diaphragm and the method of maintaining a constant level in both compartments without any flow of the solution between the two. While this method may be carried out in many ways, I prefer, for the sake of cheapness, to use the apparatus clearly shown in the following drawings.

Referring to Figs. 1, 2, 3, 4, and 5, $a$ represents a suitable support, as a floor or table, upon which are mounted the receptacles $a'$, that hold the electrolytic cells. These receptacles and their contained cells are duplicates of one another, and a description of one will suffice for all.

Although any desired receptacle may be employed, I prefer for cheapness to use a cask or barrel, as shown. The cask serves as a convenient means for holding the cells proper. These cells are composed of sides $a''$, bottom $a^x$, and an integral central partition or diaphragm $a^{12}$, composed of a body or mass of sand mixed with a binder of cement, as above described. The diaphragm $a^{12}$ divides the cell into two compartments $x'$ and $x^2$ and serves to prevent the passage of the solutions from one compartment to the other without offering any material resistance to the passage of the electric current, as described. The particular compartment in which the chlorin is to be liberated (here shown as the compartment $x'$) is provided with a cover $a^2$ to completely seal said compartment. In this compartment is located the anode $a^{13}$, composed of a series of pieces of retort-carbon $a^{15}$, strung upon a metal rod, preferably of copper, $a^{14}$. These pieces are joined to each other by cement $a^{16}$ and bound to the rod by lead $a^{17}$, poured down while in a molten condition between the rod and the cement and pieces of carbon. While any desired form of electrode may be used, I prefer to use the kind just described by reason of its cheapness as compared with the carbon plate of commerce. The rod $a^{17}$ is connected either directly or through the medium of other cells to the positive pole of a source of of electricity. The metal plate $a^{18}$ in the compartment $x^2$ constitutes the cathode and, by means of a rod $a^{19}$ and wire $a^{21}$, is connected to the negative pole of a source of electricity. The compartments $x'$ and $x^2$ are filled with brine to the height indicated by the line $x$, thus forming a closed space in the compartment $x'$ between the level $x$ of the solution and the cover $a^2$. In this space the liberated chlorin collects and is led off through a pipe $a^3$. A tube or funnel $x^3$ extends through the cover $a^2$ below the level $x$ of the solution. Through this funnel salt may be supplied to the solution in the compartment $x'$ without permitting the escape of the liberated chlorin.

A pipe $a^5$ over the open end of the compartment $x^2$ is utilized to supply brine to said compartment, as required. A pipe $a^6$ communicates with the bottom of the compartment $x^2$. This pipe is carried up on the outside of the barrel to the point where it is desired to maintain the level $x$ of the liquid in the compartment and is there bent, as at $a^9$ and $a^{10}$, to deliver certain of the contents of the said compartment into a suitable receptacle or into a trough $a^7$, communicating with said receptacle. In Fig. 1 three cells connected in series are shown, although one or more can be used. The pipes $a^{10}$ deliver into the trough $a^7$. The pipes $a^5$ are connected to a supply-pipe $a^4$, communicating with any suitable source of brine-supply, (not shown,) while the pipes $a^3$ are connected to a receiving-pipe $a^8$, preferably of lead, to withstand the action of the chlorin. This pipe $a^8$ leads to any suitable receptacle or apparatus for storing or utilizing the chlorin.

The operation of this part of my invention is as follows: The parts being constructed and arranged as shown in Figs. 1, 2, and 4, the compartments $x'$ and $x^2$ filled to the point $x$ with brine, and the electrodes suitably connected to a source of electricity, the current in passing through the electrolyte decomposes the latter, as already described. Chlorin is liberated at the anode in the compartment $x'$ and caustic soda and hydrogen as ultimate products in the compartment $x^2$. The porous partition $a^{12}$, while not materially interfering with the passage of the electric current, prevents the products of one compartment from being carried by the current into the other compartment, and prevents the chlorin from uniting with the soda or hydrogen. As soon as the solution in the compartment $x'$ becomes saturated with chlorin this gas will escape and be led off by the pipes $a^3$ and $a^8$ to any desired receptacle. In the compartment $x^2$ the hydrogen escapes to the top, or it may be collected as in the case of the chlorin, if desired. The caustic soda, being of greater specific gravity than the brine, gradually settles to the bottom of the compartment and passes off through the pipes $a^6$ into the trough $a^7$ and is led to any desired receptacle, the soda being subsequently liberated from the water by evaporation.

The diaphragm $a^{12}$, composed of particles or grains of sand united by a cement which is, for the best results, materially less in amount than the sand, so that the cement forms a binder between the contiguous points or surfaces of the sand particles and does not fill up the intergranular spaces between the said particles, is highly efficient for electrolytic purposes, as it resists the destructive action of the elements of decomposition, is of the desired porosity, does not clog up, and is solid and durable and capable of being used for a substantially indefinite time without replacing.

Having thus explained the nature of my invention and described a way of constructing and using the same, though without attempting to set forth all of the forms in which it may be made or all of the modes of its use, what I claim, and desire to secure by Letters Patent, is—

1. A diaphragm for electrolytic cells composed of a body of sand having its grains or particles united by a binder at their contiguous points or surfaces of contact to form a firm structure having intergranular spaces throughout the same forming pores for the said diaphragm, said binder being less in amount than the body of sand, substantially as described.

2. A diaphragm for electrolytic cells composed of a body of sand having its grains or particles united by a binder of hydraulic cement less in amount than the body of sand and joining the grains or particles of the sand body at their contiguous edges to form a firm structure having intergranular spaces constituting pores for the diaphragm, substantially as described.

3. In an electrolytic cell, a casing or shell, a lining for the bottom and inner side of the said shell, consisting of material capable of resisting the action of the elements of decomposition, and a transverse diaphragm integrally united to the said lining and composed of a body or mass of sand, and a binder of hydraulic cement uniting the particles of the sand body at their contiguous edges to form a firm porous body with intergranular spaces constituting the pores of the diaphragm, substantially as described.

In testimony whereof I have signed my name to this specification, in the presence of two subscribing witnesses, this 2d day of April, A. D. 1895.

ELBRIDGE BAKER.

Witnesses:
   A. D. HARRISON,
   ROLLIN ABELL.